US012713369B2

(12) United States Patent
Marcone et al.

(10) Patent No.: US 12,713,369 B2
(45) Date of Patent: Aug. 18, 2026

(54) PARTIAL REPETITION OF PHYSICAL BROADCAST CHANNEL

(71) Applicant: Nokia Technologies Oy, Espoo (FI)

(72) Inventors: Alessio Marcone, Munich (DE); Elena Peralta Calvo, Tampere (FI); Nhat-Quang Nhan, Reims (FR); Cassio Barbosa Ribeiro, Espoo (FI)

(73) Assignee: Nokia Technologies Oy, Espoo (FI)

(*) Notice: Subject to any disclaimer, the term of this patent is extended or adjusted under 35 U.S.C. 154(b) by 253 days.

(21) Appl. No.: 18/720,461

(22) PCT Filed: Dec. 17, 2021

(86) PCT No.: PCT/EP2021/086608
§ 371 (c)(1),
(2) Date: Jun. 14, 2024

(87) PCT Pub. No.: WO2023/110136
PCT Pub. Date: Jun. 22, 2023

(65) Prior Publication Data
US 2025/0088985 A1 Mar. 13, 2025

(51) Int. Cl.
*H04W 56/00* (2009.01)
*H04L 1/08* (2006.01)

(52) U.S. Cl.
CPC ............ *H04W 56/001* (2013.01); *H04L 1/08* (2013.01)

(58) Field of Classification Search
None
See application file for complete search history.

(56) References Cited

U.S. PATENT DOCUMENTS 8,775,908 B2 * 7/2014 Loghin ............ H03M 13/6393 714/776
10,602,535 B2 * 3/2020 Noh .................... H04W 72/30
11,375,528 B2 * 6/2022 Noh ................ H03M 13/2906
12,081,346 B2 * 9/2024 Talarico ............... H04L 5/0055
2012/0254684 A1 * 10/2012 Loghin .................... H04L 1/02 714/752
2019/0166611 A1 * 5/2019 Noh ................ H04W 72/1273
2020/0196338 A1 * 6/2020 Noh ................ H04W 72/1273
2022/0123902 A1 * 4/2022 Panteleev ............ H04L 1/1887
2022/0312481 A1 * 9/2022 Talarico ........... H04W 74/0866
2022/0353829 A1 * 11/2022 Zarifi ................. H04W 56/001
2025/0015916 A1 * 1/2025 Pan ..................... H04J 11/0069
2025/0088985 A1 * 3/2025 Marcone ............. H04J 11/0069

* cited by examiner

*Primary Examiner* — Gregory B Sefcheck
(74) *Attorney, Agent, or Firm* — Barta Jones, PLLC

(57) ABSTRACT

Disclosed is a method comprising receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

17 Claims, 9 Drawing Sheets

- For $L_{max} = 64$
  6th, 5rd and 4nd bits of SSB
- Otherwise
  $\bar{a}_{\bar{A}+5}$ is the MSB of $k_{SSB}$
  and $\bar{a}_{\bar{A}+6}, \bar{a}_{\bar{A}+7}$ are reserved 4th, 3rd, 2nd and 1st LSB of SFN

202

204

$\bar{a}_0, \bar{a}_1, \ldots, \bar{a}_{\bar{A}-1}, \bar{a}_{\bar{A}}, \bar{a}_{\bar{A}+1}, \bar{a}_{\bar{A}+2}, \bar{a}_{\bar{A}+3}, \bar{a}_{\bar{A}+4}, \bar{a}_{\bar{A}+5}, \bar{a}_{\bar{A}+6}, \bar{a}_{\bar{A}+7}$ 201
MIB (assuming a payload size $\bar{A}$)

202-1

203
Half radio frame bit

PARTIAL REPETITION OF PHYSICAL BROADCAST CHANNEL

FIELD

The following exemplary embodiments relate to wireless communication.

BACKGROUND

As resources are limited, it is desirable to optimize the usage of network resources. A cell in a cellular communication network may be utilized to enable better usage of resources.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive a physical broadcast channel in a synchronization signal block, wherein a payload of the physical broadcast channel comprises at least a set of least significant bits of a system frame number, and the set of least significant bits indicates, at least partly, one or more values of the system frame number; receive at least one partial repetition of the payload of the physical broadcast channel, wherein the at least one partial repetition comprises at least a subset of the set of least significant bits; and decode the payload of the physical broadcast channel based on the at least one partial repetition of the payload.

According to another aspect, there is provided an apparatus comprising means for: receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

According to another aspect, there is provided a method comprising: receiving, by a terminal device, a physical broadcast channel in a synchronization signal block, wherein a payload of the physical broadcast channel comprises at least a set of least significant bits of a system frame number, and the set of least significant bits indicates, at least partly, one or more values of the system frame number; receiving, by the terminal device, at least one partial repetition of the payload of the physical broadcast channel, wherein the at least one partial repetition comprises at least a subset of the set of least significant bits; and decoding, by the terminal device, the payload of the physical broadcast channel based on the at least one partial repetition of the payload.

According to another aspect, there is provided a computer program product comprising program instructions which, when run on a computing apparatus, cause the computing apparatus to perform at least the following: receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

According to another aspect, there is provided a computer program comprising instructions for causing an apparatus to perform at least the following: receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

According to another aspect, there is provided a computer readable medium comprising program instructions for causing an apparatus to perform at least the following: receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

According to another aspect, there is provided a non-transitory computer readable medium comprising program instructions for causing an apparatus to perform at least the following: receiving a physical broadcast channel in a synchronization signal block, wherein a payload of the physical broadcast channel comprises at least a set of least significant bits of a system frame number, and the set of least significant bits indicates, at least partly, one or more values of the system frame number; receiving at least one partial repetition of the payload of the physical broadcast channel, wherein the at least one partial repetition comprises at least a subset of the set of least significant bits; and decoding the payload of the physical broadcast channel based on the at least one partial repetition of the payload.

According to another aspect, there is provided an apparatus comprising at least one processor, and at least one memory including computer program code, wherein the at least one memory and the computer program code are configured, with the at least one processor, to cause the apparatus to: transmit a physical broadcast channel in a synchronization signal block, wherein a payload of the physical broadcast channel comprises at least a set of least significant bits of a system frame number, and the set of least significant bits indicates, at least partly, one or more values of the system frame number; and transmit at least one partial repetition of the payload of the physical broadcast channel, wherein the at least one partial repetition comprises at least a subset of the set of least significant bits.

According to another aspect, there is provided an apparatus comprising means for: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits.

According to another aspect, there is provided a method comprising: transmitting, by a network element of a wireless communication network, a physical broadcast channel in a synchronization signal block, wherein a payload of the physical broadcast channel comprises at least a set of least significant bits of a system frame number, and the set of least significant bits indicates, at least partly, one or more values of the system frame number; and transmitting, by the network element, at least one partial repetition of the payload of the physical broadcast channel, wherein the at least one partial repetition comprises at least a subset of the set of least significant bits.

According to another aspect, there is provided a computer program comprising instructions for causing an apparatus to perform at least the following: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits.

According to another aspect, there is provided a computer program product comprising program instructions which, when run on a computing apparatus, cause the computing apparatus to perform at least the following: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits.

According to another aspect, there is provided a computer readable medium comprising program instructions for causing an apparatus to perform at least the following: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits.

According to another aspect, there is provided a non-transitory computer readable medium comprising program instructions for causing an apparatus to perform at least the following: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits.

According to another aspect, there is provided a system comprising at least a terminal device and a network element of a wireless communication network. The network element is configured to: transmit a physical broadcast channel in a synchronization signal block, wherein a payload of the physical broadcast channel comprises at least a set of least significant bits of a system frame number, and the set of least significant bits indicates, at least partly, one or more values of the system frame number; and transmit at least one partial repetition of the payload of the physical broadcast channel, wherein the at least one partial repetition comprises at least a subset of the set of least significant bits. The terminal device is configured to: receive the physical broadcast channel in the synchronization signal block, wherein the payload of the physical broadcast channel comprises at least the set of least significant bits of the system frame number; receive the at least one partial repetition of the payload of the physical broadcast channel, wherein the at least one partial repetition comprises the at least the subset of the set of least significant bits; and decode the payload of the physical broadcast channel based on the at least one partial repetition of the payload.

According to another aspect, there is provided a system comprising at least a terminal device and a network element of a wireless communication network. The network element comprises means for: transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits. The terminal device comprises means for: receiving the physical broadcast channel in the synchronization signal block, wherein the payload of the physical broadcast channel comprises at least the set of least significant bits of the system frame number; receiving the at least one partial repetition of the payload of the physical broadcast channel, wherein the at least one partial repetition comprises the at least the subset of the set of least significant bits; and decoding the payload of the physical broadcast channel based on the at least one partial repetition of the payload.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to “an”, “one”, or “some” embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), or beyond 5G, without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
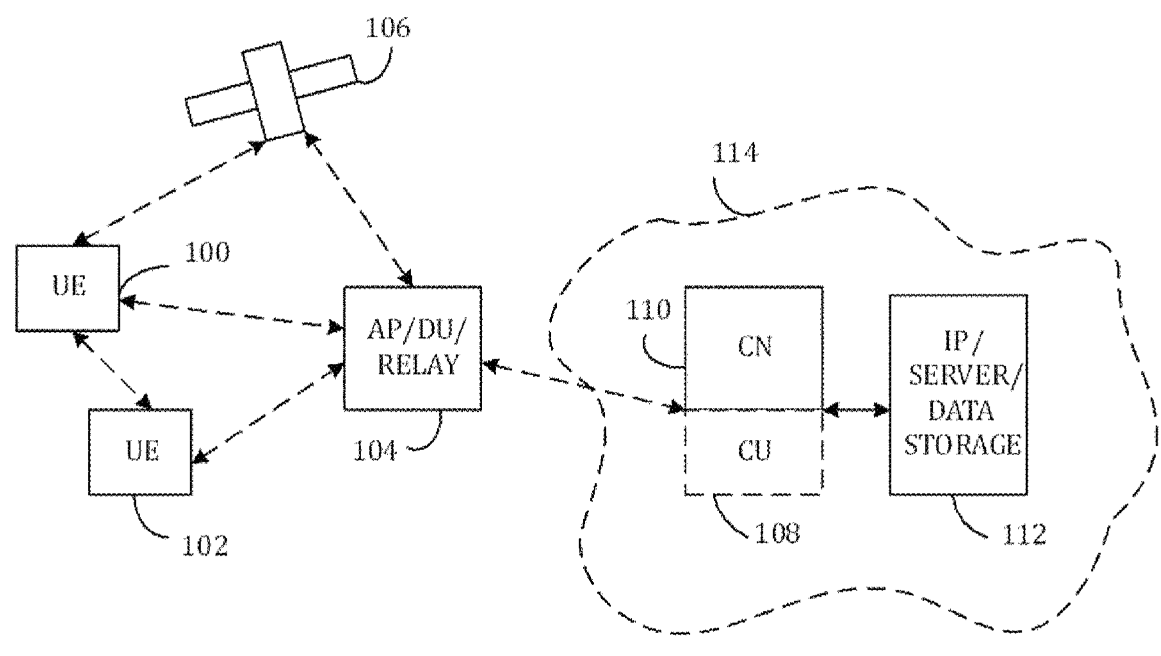
FIG. 1 illustrates an exemplary embodiment of a cellular communication network.
FIG. 2 illustrates an example of a physical broadcast channel payload.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g) NodeB) 104 providing the cell. The physical link from a user device to a (e/g) NodeB may be called uplink or reverse link and the physical link from the (e/g) NodeB to the user device may be called downlink or forward link. It should be appreciated that (e/g) NodeBs or their functionalities may be implemented by using any node, host, server or access point etc. entity suitable for such a usage.

A communication system may comprise more than one (e/g) NodeB, in which case the (e/g) NodeBs may also be configured to communicate with one another over links, wired or wireless, designed for the purpose. These links may be used for signaling purposes. The (e/g) NodeB may be a computing device configured to control the radio resources of communication system it is coupled to. The (e/g) NodeB may also be referred to as a base station, an access point or any other type of interfacing device including a relay station capable of operating in a wireless environment. The (e/g) NodeB may include or be coupled to transceivers. From the transceivers of the (e/g) NodeB, a connection may be provided to an antenna unit that establishes bi-directional radio links to user devices. The antenna unit may comprise a plurality of antennas or antenna elements. The (e/g) NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may also comprise other apparatuses, such as physical layer relay nodes or other network elements, etc. At least one of the (e/g) NodeBs or may be a Home (e/g) nodeB.

Furthermore, the (e/g) nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g) nodeB or base station. The DU may be defined as a logical node hosting radio link control (RLC), medium access control (MAC) and/or physical (PHY) layers of the (e/g) nodeB or base station. The operation of the DU may be at least partly controlled by the CU. The CU may comprise a control plane (CU-CP), which may be defined as a logical node hosting the RRC and the control plane part of the PDCP protocol of the CU for the (e/g) nodeB or base station. The CU may further comprise a user plane (CU-UP), which may be defined as a logical node hosting the user plane part of the PDCP protocol and the SDAP protocol of the CU for the (e/g) nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g) NodeBs may be introduced. A network which may be able to use "plug-and-play" (e/g) NodeBs, may include, in addition to Home (e/g) NodeBs (H (e/g) nodeBs), a home node B gateway, or HNB-GW (not shown in FIG. 1). A HNB Gateway (HNB-GW), which may be installed within an operator's network, may aggregate traffic from a large number of HNBs back to a core network.

To enable a UE to find a cell while entering a system, as well as to find new cells when moving within the system, the UE may use synchronization signals and the physical broadcast channel (PBCH) to derive the information needed to access the target cell. The synchronization signals may comprise a primary synchronization signal (PSS) and a secondary synchronization signal (SSS), which may be periodically transmitted on the downlink from the target cell. Once the UE successfully detects the PSS and/or SSS, it obtains knowledge about the synchronization and physical cell identity (PCI) of the target cell, and the UE is then ready to decode the PBCH. The PBCH carries information needed for further system access, for example to acquire the system information block type 1 (SIB1) of the target cell. The PSS and SSS along with the PBCH can be jointly referred to as a synchronization signal block (SSB). SSB may also be referred to as SS/PBCH block, wherein SS is an abbreviation for synchronization signal.

SSB may be transmitted in a beamformed manner in NR frequency range 1 (FR1) and frequency range 2 (FR2). Aiming to cover the whole cell space, multiple SSB transmissions may occur in a so-called SSB burst, which may be comprised within a 5 ms window, for example. The candidate SSBs in a half radio frame may be indexed in an ascending order in time from 0 to $\bar{L}_{max}-1$, where $\bar{L}_{max}$ is determined according to the SSB patterns for the so-called Cases A to E. Therefore, the maximum number of SSBs in one SSB burst may currently be 4 or 8 for FR1, and 64 for FR2. For a half radio frame with SSBs, the first symbol indexes for candidate SSBs may be determined according to the subcarrier spacing (SCS) of SSBs, where index n=0 corresponds to the first symbol of the first slot in a half-frame.

The PBCH payload carries cell and time information. The PBCH payload can be split into the master information block (MIB) and time information, as illustrated in FIG. 2.

FIG. 2 illustrates an example of a PBCH payload for a MIB payload size of $\bar{A}$ bits, without cyclic redundancy check (CRC) attachment. Referring to FIG. 2, the MIB 201 provides the UE with parameters needed for monitoring of the physical downlink control channel (PDCCH) for scheduling the physical downlink shared channel (PDSCH) that carries SIB1, whereas the time information part can be split into the least significant bits (LSB) 202 of the system frame number (SFN), half radio frame bit 203, and the beam index 204. The most significant bits (MSB) of SFN may be embedded in the MIB.

Figure 3:
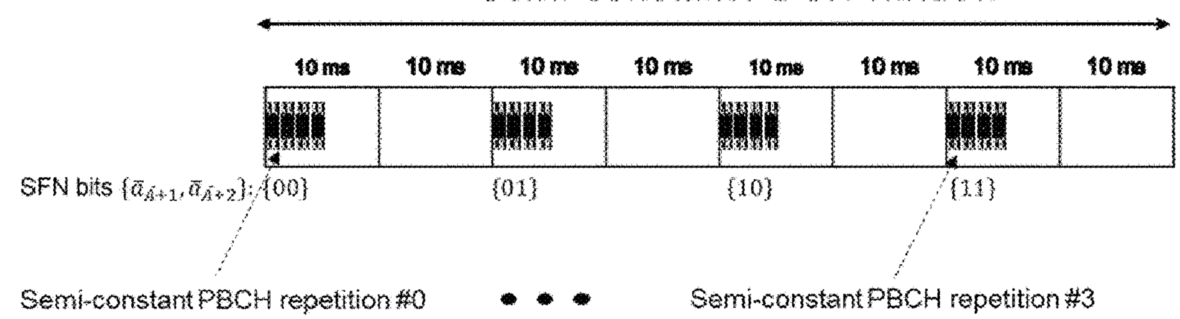
FIG. 3 illustrates an example of synchronization signal block bursts.

FIG. 3 illustrates an example of SSB bursts with a periodicity of 20 ms, wherein each SSB burst comprises a specific PBCH repetition per SSB in an SSB burst. The PBCH repetitions may be considered semi-constant considering that, in a time window 301 of 80 ms, most of the bits of the PBCH payload may be expected to stay constant and to be repeated four times assuming a periodicity of two radio frames (20 ms) for the SSB bursts, as illustrated in FIG. 3. In this case, the MIB, half frame bit and SSB index for the same SSB across different SSB bursts (with the same starting symbol within an SSB burst) may not change within the time window 301, while part of the LSB bits of SFN are different at each SSB burst. In particular, referring to FIG. 2, the two bits $\bar{a}_{\bar{A}+1}$ and $\bar{a}_{\bar{A}+2}$ 202-1 of the LSB bits 202 may change at each SSB burst and indicate a maximum of four different values of SFN in a range of 80 ms. In addition, considering that the CRC attachment may be computed by using all the bits of the PBCH payload, the CRC may also change within the 80 ms time window. Because of these characteristics, this 80 ms time window 301 may be referred to as a semi-constant PBCH window, and the relative PBCH transmissions within this time window may be referred to as semi-constant PBCH repetitions.

In LTE, the PBCH reliability enhancement was achieved by time-repeating the entire PBCH symbols. The repetitions occur in subframes 0 and 5 of the same radio frame for FDD frame structure, whereas for TDD and normal cyclic prefix, PBCH core symbols 0 and 1 are repeated 5 times and symbols 2 and 3 are repeated 3 times.

In NR, due to the beamformed access, applying the same framework described for LTE PBCH repetitions becomes challenging, especially in FR2, since the time available for an SSB burst is rather limited. For example, up to 64 SSBs may need to be transmitted on different beams in a rather short 5 ms SSB burst window.

Reduced capability (RedCap) devices may have lower complexity (e.g., reduced bandwidth and number of antennas), a longer battery life, and a smaller form factor than "full capability" NR UEs, such as enhanced mobile broadband (eMBB) and ultra-reliable low latency communication (URLLC) devices. For example, a RedCap device may comprise at least one reception antenna port in both FR1 and FR2. RedCap devices may support all FR1 and FR2 bands for frequency-division duplexing (FDD) and time-division duplexing (TDD). Some examples of RedCap devices are industrial wireless sensors, video surveillance cameras, and wearables (e.g., smart watches, rings, eHealth-related devices, personal protection equipment, medical monitoring devices, etc.). RedCap devices may also be referred to as NR-Lite devices or NR-Light devices.

The reduced number of reception antennas in a RedCap device may impact, among others, the reliability of downlink (DL) channels, since spatial diversity at the receiver cannot be exploited (e.g., the RedCap device may comprise only one reception antenna). In this case, a signal-to-noise ratio (SNR) loss of approximately 6 dB may be expected, when compared with a UE equipped with four reception antennas, for example. For these reasons, RedCap devices may suffer from DL coverage shortage compared to "full capability" UEs, considering the lower number of reception antennas.

RedCap devices may also be characterized by a minimum bandwidth of 20 MHz in FR2. This limitation may impact the reception of SSBs at 120 KHz SCS, since the available bandwidth is narrower than the frequency span of the SSB of approximately 29 MHz.

NR may support railway, smart grid, and public protection and disaster relief (PPDR) communication use cases. Such applications may be characterized by a limited spectral allocation between 3 and 5 MHz (in FR1), which may also impact the reception of SSBs at 15 kHz SCS considering their occupancy of 3.6 MHz. In this case, PBCH may need to be punctured in order to comply with a 3 MHz spectrum allocation, and the receiver performance may consequently be impacted.

Herein puncturing means that the punctured frequency resources are left without a signal in the transmitter. Thus, the time-domain signal in transmitting antennas does not carry those frequency components in the carrier, when puncturing is applied. In other words, the gNB may prepare the PBCH (encoding, mapping to physical resources, etc.), but the punctured PBCH resource blocks are not transmitted (i.e., only the non-punctured PBCH resource blocks are transmitted). PBCH puncturing may be needed to narrow down the bandwidth of SSB to match the available bandwidth. The negative performance impact of puncturing may be at least partly compensated by a power boost, where the transmission power of the punctured resource blocks is allocated at least partially for the non-punctured resource blocks.

In the use cases mentioned above, impact to SSB performance and reliability is expected. One technique to increase the reliability of a specific channel is to repeat the transmitted data over time, in order to enable soft bits combination at the receiver (e.g., combining of the log-likelihood ratios at the receiver from multiple transmissions/repetitions). However, this is not currently supported in NR specifications for the SSBs. Introduction of time-domain repetitions of PBCH symbols following the LTE framework is not straightforward considering the limited amount of time resources available in a 5 ms SSB burst window. For example, six orthogonal frequency-division multiplexing (OFDM) symbols may be available in the first slot, in which two back-to-back SSBs may be transmitted with two different gNB beams. Based on the LTE framework, each PBCH symbol would need to be repeated at least three times, requiring a total of at least 6 (PBCH OFDM symbols of two consecutive SSBs) by 3 (repetitions) equal to 18 OFDM symbols. However, even considering all remaining OFDM symbols in the slot as available (6 OFDM symbols), the required 18 OFDM symbols for repetitions will not be available in one slot.

In addition, even if most of the PBCH payload content is expected to remain the same in the semi-constant PBCH window (illustrated in FIG. 3), UEs may not currently be able to soft combine the semi-constant PBCH repetitions. One possible way for a UE to be able to soft combine the semi-constant PBCH repetitions would be by having knowledge of the changing SFN bits ($\bar{a}_{\bar{A}+1}$ and $\bar{a}_{\bar{A}+2}$ in FIG. 2), which would not be possible in case the CRC of a single PBCH transmission does not check out (i.e., when the reception is not reliable and soft combining is necessary). Conversely, in case the CRC checks out (and hence the SFN bits can be considered reliable), there would be no need for the UE to soft combine the received PBCH with other semi-constant repetitions, since the received payload can be considered reliable.

Some exemplary embodiments provide a method to increase the reliability and coverage of PBCH without fully repeating the entire PBCH payload in multiple time slots, but by exploiting the semi-constant repetitions of the PBCH payload already present in a semi-constant PBCH window (as illustrated FIG. 3) together with a repetition of at least the two variable SFN LSB bits ($\bar{a}_{\bar{A}+1}$ and $\bar{a}_{\bar{A}+2}$ in FIG. 2). This partial repetition of the PBCH payload may be referred to as SFN repetition (SFN REP) herein. The SFN REP may be transmitted with each SSB. For example, each SSB in one SSB burst may have its own SFN REP, and also SSBs belonging to different bursts may have their own SFN REP. It should be noted that the PBCH payload is not fully repeated at each SSB burst, since the PBCH also carries information on SFN, and each SSB burst occurs in a different SFN. Furthermore, the PBCH payload of each SSB in one SSB burst may be different, since the SSB index of each SSB in the SSB burst may be different, and the SSB index is carried in the PBCH payload.

This partial repetition (SFN REP) enables more reliable detection of the SFN bits, regardless of the outcome of the PBCH CRC check, which may be exploited to coherently combine the bits of the PBCH semi-constant repetitions within the semi-constant PBCH window. In other words, a reliable detection of the SFN bits through SFN REP allows coherent combining of the whole PBCH payload across different semi-constant PBCH repetitions, even when the CRC of the received PBCH payload does not check out (i.e., fails).

Figure 4:
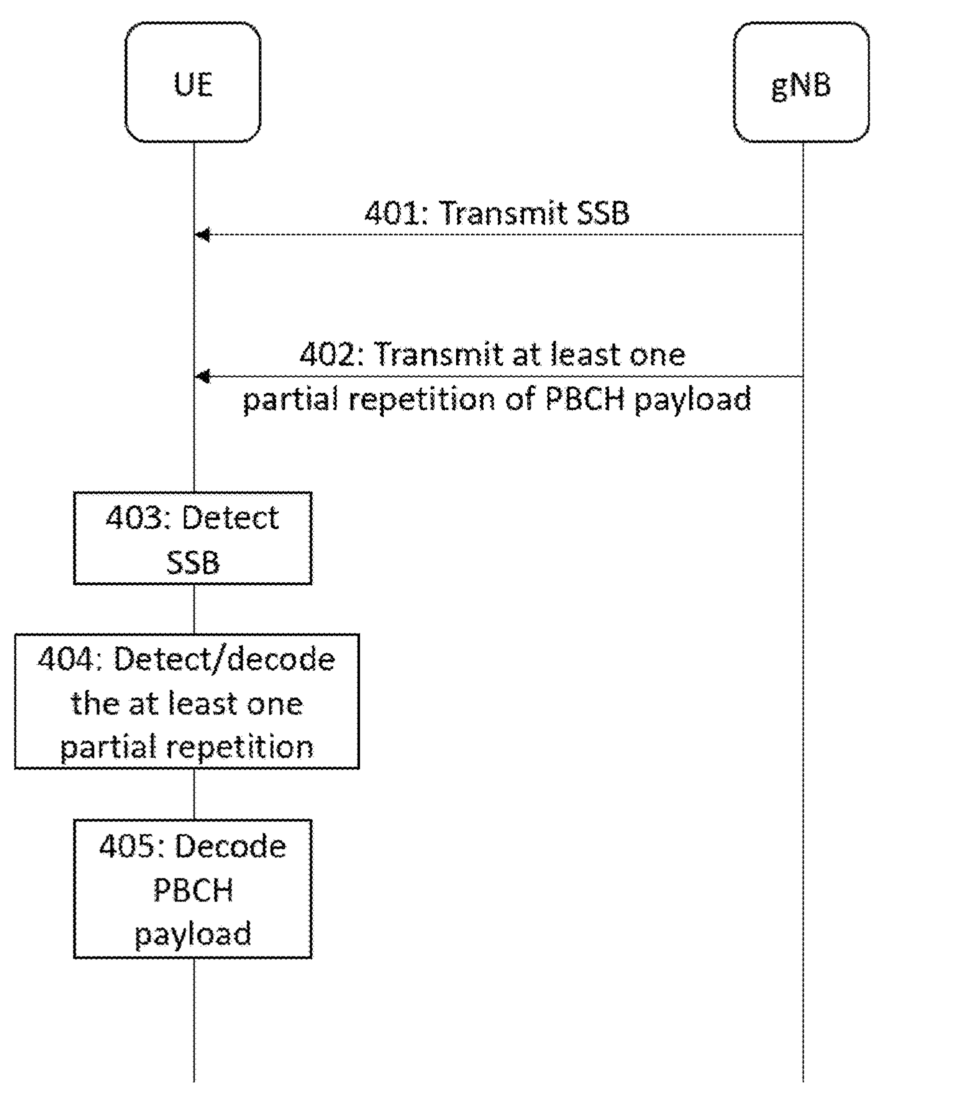
FIG. 4 illustrates a signaling diagram according to an exemplary embodiment.

FIG. 4 illustrates a signaling diagram according to an exemplary embodiment. Referring to FIG. 4, in step 401, a network element of a wireless communication network transmits an SSB to a UE, wherein the SSB comprises at least a PBCH, a PSS, and an SSS. The payload of the PBCH comprises at least a set of least significant bits of an SFN. The set of least significant bits indicates, at least partly, one or more values of the SFN. The network element may comprise, for example, a base station such as a gNB.

Figure 9:
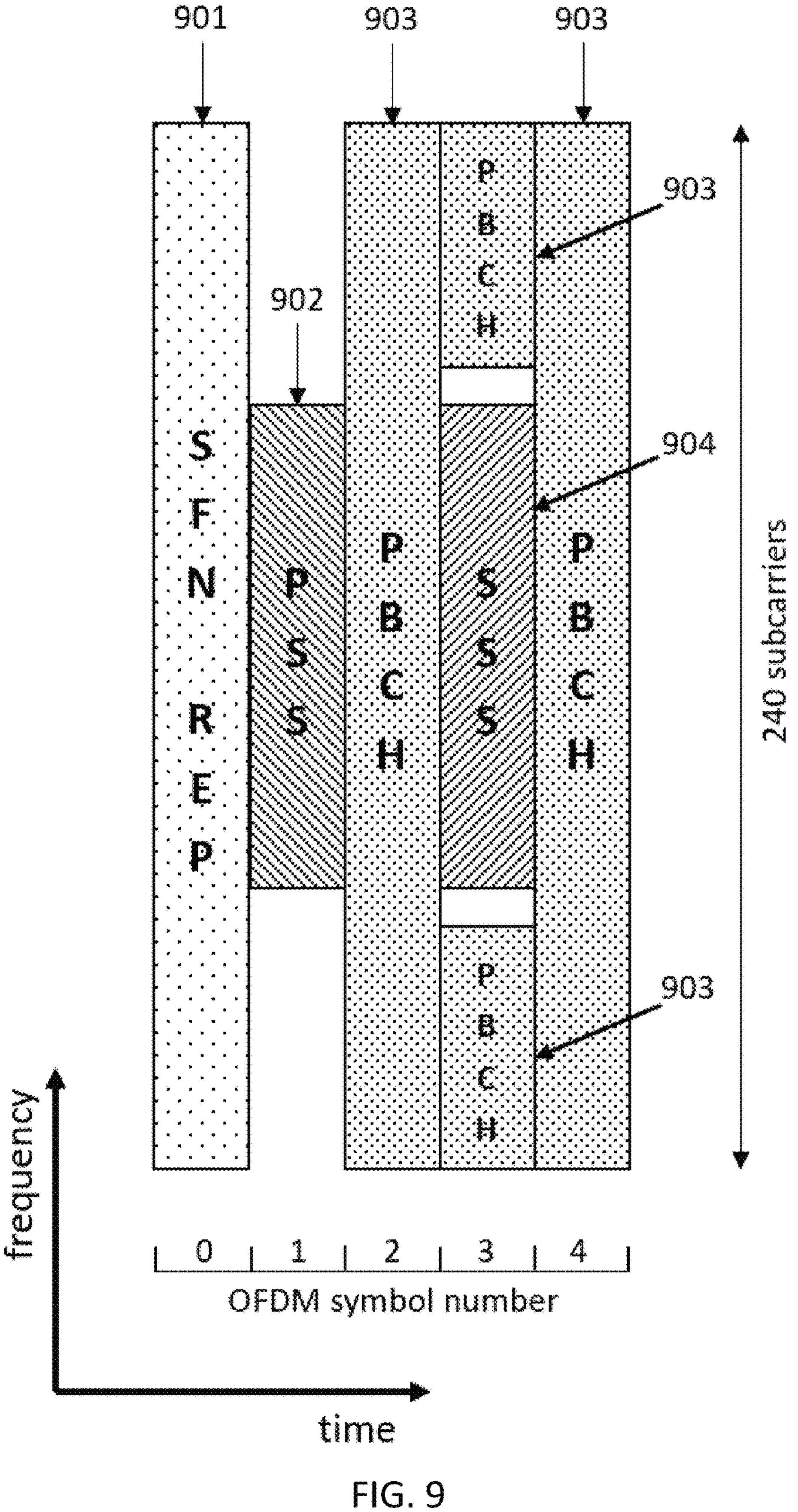
FIGS. 9-12 illustrate examples of synchronization signal blocks according to some exemplary embodiments.
Figure 10:
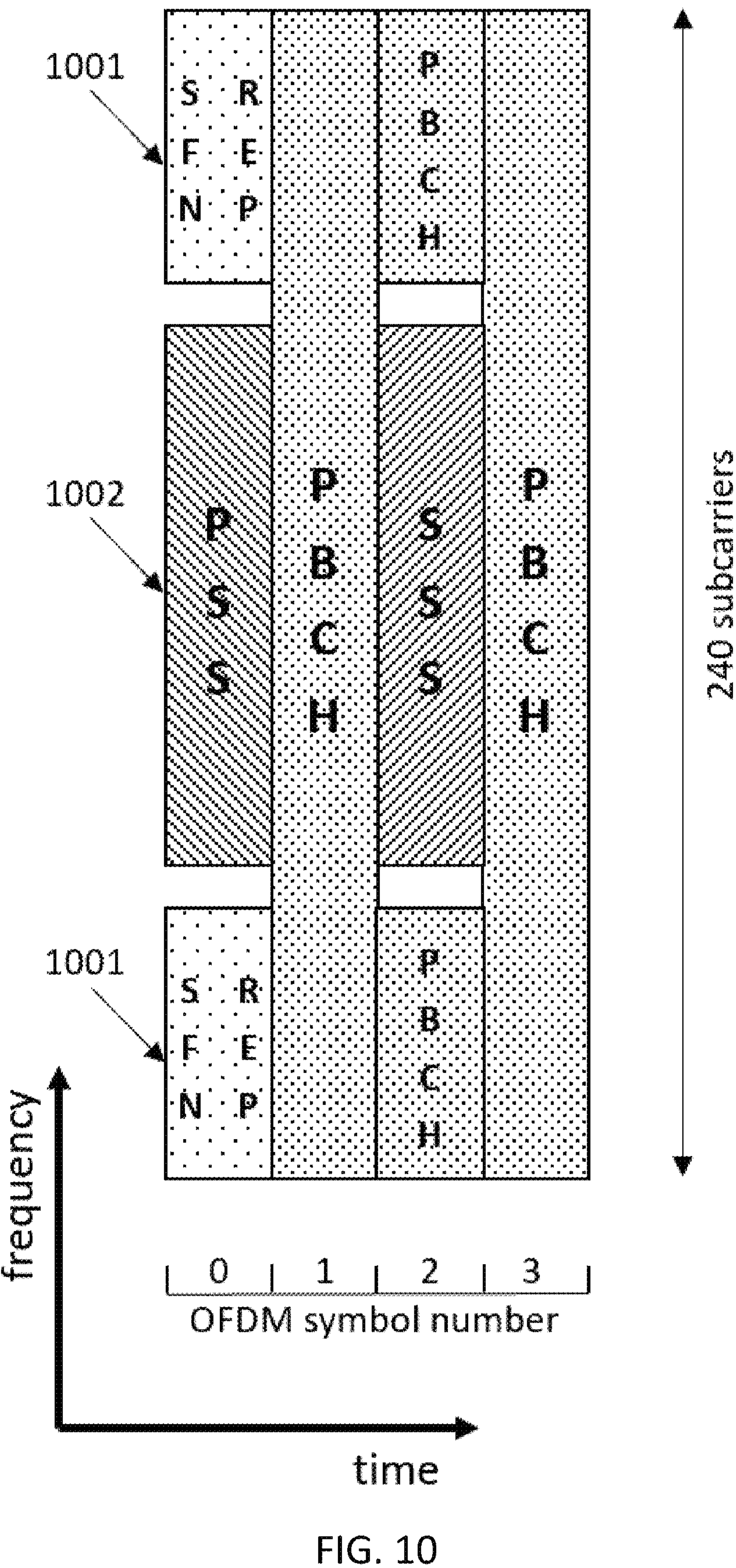
Figure 11:
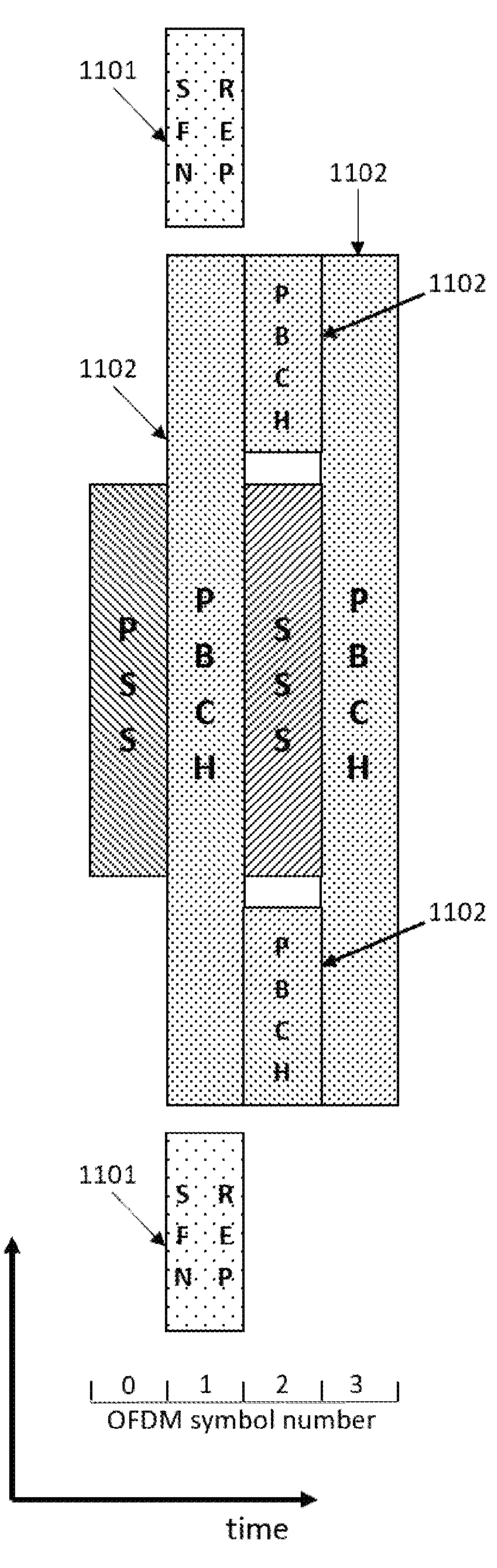

Some examples of the SSB structure are presented in FIGS. 9-11. However, it should be noted that the SSB structure may also be different than presented in FIGS. 9-11. The payload of the PBCH (or a codeword indicative of the payload) may be comprised in one or more symbols (e.g., spread over three symbols) in the SSB. The PSS may be comprised in at least one symbol in the SSB, and the SSS may be comprised in at least one symbol in the SSB. It should be noted that herein the term "symbol" refers to an OFDM symbol.

In step 402, the network element transmits at least one partial repetition of the payload of the PBCH to the UE. The at least one partial repetition may be transmitted before the SSB, after the SSB, or in the SSB, as long as the at least one partial repetition is transmitted in the same beam and in the same SSB burst as the associated SSB. The at least one partial repetition comprises at least a subset of the set of least significant bits of the SFN. The set of least significant bits may comprise at least four bits, and the at least subset of the set of least significant bits may comprise at least two bits of the at least four bits. For example, the at least subset of the set of least significant bits may comprise at least the two variable SFN LSB bits $\bar{a}_{\bar{A}+1}$ and $\bar{a}_{\bar{A}+2}$ from the four bits 202 illustrated in FIG. 2. The at least one partial repetition may also be referred to as SFN repetition (SFN REP) herein.

For example, the at least one partial repetition may be comprised in the same symbol as the PSS transmitted in the SSB. In other words, the at least one partial repetition may be mapped around the PSS symbol in the frequency domain.

Alternatively or additionally, the at least one partial repetition may be comprised in a symbol preceding or following the symbol comprising the PSS.

Alternatively or additionally, the at least one partial repetition may be comprised in at least one symbol of the one or more symbols comprising the PBCH payload (or the codeword indicative of the PBCH payload).

Alternatively or additionally, the at least one partial repetition may be comprised in a symbol preceding or following the one or more symbols comprising the PBCH payload (or the codeword indicative of the PBCH payload).

In one example, the at least one partial repetition may be carried by a sequence of a non-orthogonal or orthogonal sequence set (i.e., a sequence-based transmission), such as a Zadoff-Chu sequence or a Gold sequence. Such sequences may also be used for transmission of synchronization signals (e.g., PSS and SSS) and/or reference signals (e.g., DMRS and SRS) in 5G NR. In addition, in case the network element is expected to transmit data (e.g., PDSCH) in the same symbol as the at least one partial repetition, either a mapping around the at least one partial repetition or a puncturing scheme may be adopted to multiplex such channels in the frequency domain. However, it should be noted that other techniques than sequency-based transmission may also be used to transmit the at least one partial repetition.

In step 403, the UE detects the SSB transmitted by the network element.

In step 404, the UE detects and/or decodes the at least one partial repetition of the payload of the PBCH.

In step 405, the UE decodes the payload of the PBCH based at least partly on the at least subset of the set of least significant bits comprised in the at least one partial repetition. Herein decoding the payload of the PBCH may refer to decoding the codeword indicative of the payload of the PBCH.

Figure 5:
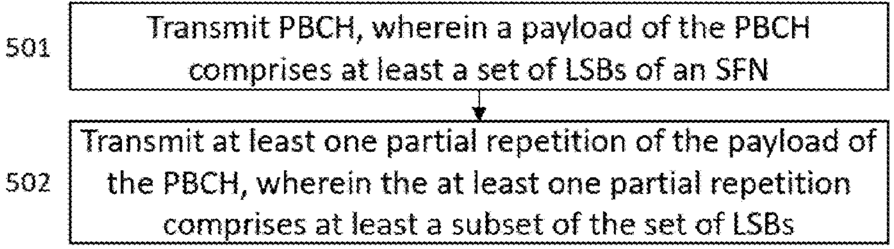
FIGS. 5-7 illustrate flow charts according to some exemplary embodiments.

FIG. 5 illustrates a flow chart according to an exemplary embodiment. The steps illustrated in FIG. 5 may be performed by an apparatus such as, or comprised in, a network element of a wireless communication network.

Referring to FIG. 5, in step 501, a physical broadcast channel (PBCH) is transmitted in a synchronization signal block (SSB), wherein a payload of the physical broadcast channel comprises at least a set of least significant bits (LSB) of a system frame number (SFN), and the set of least significant bits indicates, at least partly, one or more values of the system frame number;

In step 502, at least one partial repetition of the payload of the physical broadcast channel is transmitted, wherein the at least one partial repetition comprises at least a subset of the set of least significant bits. The set of least significant bits may comprise at least four bits, and the at least the subset of the set of least significant bits may comprise at least two bits of the at least four bits. For example, the at least the subset of the set of least significant bits may comprise at least the two variable SFN LSB bits $\bar{a}_{\bar{A}+1}$ and $\bar{a}_{\bar{A}+2}$ from the four bits 202 illustrated in FIG. 2.

Figure 6:
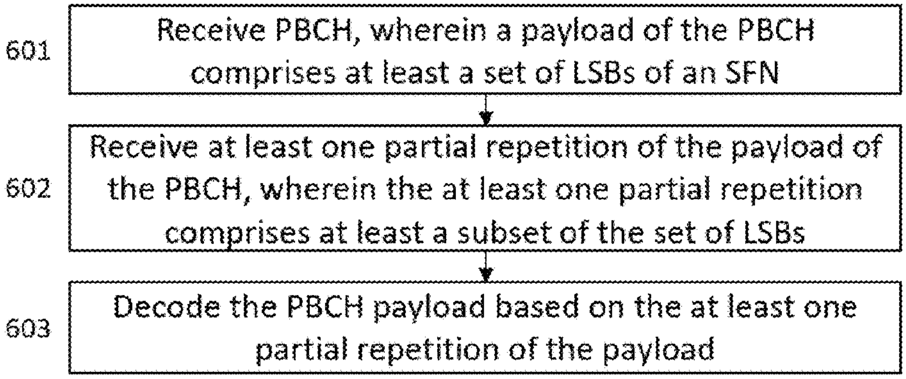

FIG. 6 illustrates a flow chart according to an exemplary embodiment. The steps illustrated in FIG. 6 may be performed by an apparatus such as, or comprised in, a terminal device. The terminal device may also be referred to as a user device, user equipment, or UE herein. For example, the terminal device may be a RedCap device or any other UE.

Referring to FIG. 6, in step 601, a physical broadcast channel (PBCH) is received in a synchronization signal block (SSB), wherein a payload of the physical broadcast channel comprises at least a set of least significant bits (LSB) of a system frame number (SFN), and the set of least significant bits indicates, at least partly, one or more values of the system frame number.

In step 602, at least one partial repetition of the payload of the physical broadcast channel is received, wherein the at least one partial repetition comprises at least a subset of the set of least significant bits. The set of least significant bits may comprise at least four bits, and the at least the subset of the set of least significant bits may comprise at least two bits of the at least four bits. For example, the at least the subset of the set of least significant bits may comprise at least the two variable SFN LSB bits $\bar{a}_{\bar{A}+1}$ and $\bar{a}_{\bar{A}+2}$ from the four bits 202 illustrated in FIG. 2.

In step 603, the payload of the physical broadcast channel is decoded based on the at least one partial repetition of the payload. Herein decoding the payload of the physical broadcast channel may refer to decoding a codeword indicative of the payload of the physical broadcast channel.

Figure 7:
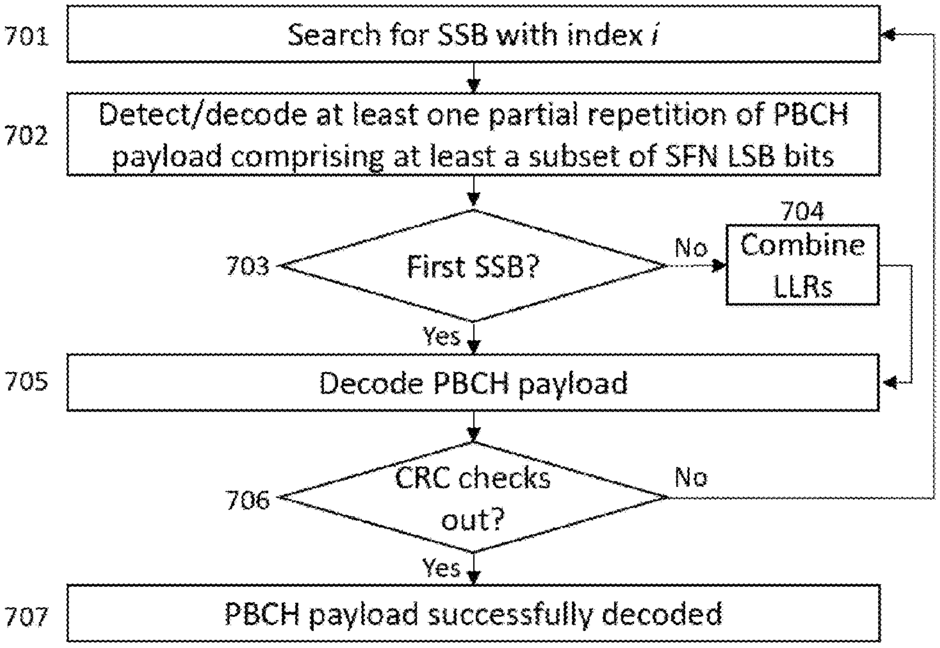

FIG. 7 illustrates a flow chart according to an exemplary embodiment for coherent combining of the log-likelihood ratios (LLRs) of the bits of the codeword indicative of the PBCH payload across different semi-constant PBCH repetitions. The steps illustrated in FIG. 7 may be performed by an apparatus such as, or comprised in, a terminal device. The terminal device may also be referred to as a user device, user equipment, or UE herein. For example, the terminal device may be a RedCap device or any other UE.

Referring to FIG. 7, in step 701, the UE searches for an SSB with SSB index i and for its associated SFN REP.

In step 702, the UE detects the SSB, as well as detects and/or decodes at least one partial repetition (SFN REP) of a PBCH payload associated with the detected SSB, wherein the at least one partial repetition comprises at least a subset of the set of least significant bits of the SFN. For example, the subset may comprise at least the two variable SFN LSB bits $\bar{a}_{\bar{A}+1}$ and $\bar{a}_{\bar{A}+2}$. Whether the UE detects or decodes the SFN REP depends on the way the bits are conveyed. For example, in the case of a sequence-based SFN REP transmission, the UE may detect the sequence and extract the SFN bits.

In step 703, the UE determines, based at least partly on the at least the subset of the set of least significant bits, whether the detected SSB is the first SSB within a time window. The time window may refer to the semi-constant PBCH window 301 illustrated in FIG. 3. For example, the UE may check whether the values of the SFN LSB bits $\bar{a}_{\bar{A}+1}$ and $\bar{a}_{\bar{A}+2}$ belong to the set {01,10,11} in order to determine whether the UE detected the first SSB in the semi-constant PBCH window or not. If the values of the SFN LSB bits $\bar{a}_{\bar{A}+1}$ and $\bar{a}_{\bar{A}+2}$ belong to the set {01,10,11}, then this may indicate that the detected SSB is not the first SSB within the time window.

In other words, if the value of the $\bar{a}_{\bar{A}+1}$ bit is 0 and the value of the $\bar{a}_{\bar{A}+2}$ bit is 1, then this may indicate that the detected SSB is the second SSB within the time window (i.e., not the first SSB).

If the value of the $\bar{a}_{\bar{A}+1}$ bit is 1 and the value of the $\bar{a}_{\bar{A}+2}$ bit is 0, then this may indicate that the detected SSB is the third SSB within the time window (i.e., not the first SSB).

If the value of the $\bar{a}_{\bar{A}+1}$ bit is 1 and the value of the $\bar{a}_{\bar{A}+2}$ bit is 1, then this may indicate that the detected SSB is the fourth SSB within the time window (i.e., not the first SSB).

On the other hand, if the value of the $\bar{a}_{\bar{A}+1}$ bit is 0 and the value of the $\bar{a}_{\bar{A}+2}$ bit is 0, then this may indicate that the detected SSB is the first SSB within the time window.

In step 704, if the detected SSB is not the first SSB within the time window based on the determination (703: no), the UE combines one or more LLRs of the codeword indicative of the PBCH payload with one or more LLRs of one or more codewords indicative of other PBCH payloads received previously within the time window, based at least partly on the at least the subset of the set of least significant bits. As a non-limiting example, there may be 864 LLRs per codeword indicative of the PBCH payload. In order to coherently combine the LLRs of the codeword indicative of the PBCH payloads transmitted in different radio frames, the SFN may be known and exploited to derive a binary mask to make the current PBCH LLRs coherent with previously received PBCH LLRs.

In step 705, following step 704, the UE may decode the codeword indicative of the PBCH payload by decoding the combined one or more LLRs. In other words, based on the outcome of the check in step 703, the UE may combine the LLR from available PBCH repetitions after appropriate pre-processing and/or decode the PBCH LLRs.

Alternatively, if the detected SSB is the first SSB within the time window based on the determination (703: yes), then the UE may attempt to decode the standalone codeword indicative of the PBCH payload in step 705 without combining it with other codewords indicative of other PBCH payloads.

In step 706, the UE checks whether the CRC associated with the PBCH payload checks out.

In step 707, if the CRC checks out (706: yes), then the UE determines that the PBCH payload is successfully decoded.

Alternatively, if the CRC does not check out (706: no), then the UE returns to step 701 to search for another SSB associated with the same index i, for example in a different SSB burst.

The steps and/or blocks described above by means of FIGS. 4-7 are in no absolute chronological order, and some of them may be performed simultaneously or in an order differing from the described one. Other steps and/or blocks may also be executed between them or within them.

The polar encoder that may be used for encoding the PBCH payload is non-systematic, which requires the received LLRs to be pre-processed before coherent combining with the LLRs of the previous or next semi-constant PBCH repetition(s). Herein non-systematic means that the input bits are not reflected at the output. When the input bits (i.e., the PBCH payload) are provided to the non-systematic polar encoder, it outputs a codeword that is related to the input, but is not mapped one-to-one.

For example, a change of the two variable bits $\bar{a}_{\bar{A}+1}$ and $\bar{a}_{\bar{A}+2}$ from {0,0} to {0,1} between two successive PBCH repetitions (in a semi-constant PBCH window) creates a deterministic change to the other bits of the encoded PBCH payload, which can be utilized for coherent combining, as long as $\bar{a}_{\bar{A}+1}$ and $\bar{a}_{\bar{A}+2}$ for the two repetitions are known. Indeed, if the change of the bits $\bar{a}_{\bar{A}+1}$ and $\bar{a}_{\bar{A}+2}$ instead was from {0,1} to {1,0}, the change to the other bits of the encoded PBCH payload would still be deterministic, but different than the previous one. For this reason, the exact knowledge of the two variable SFN LSB bits at UE for a single SS/PBCH block is fundamental for coherent combining of the semi-constant PBCH repetitions.

Additionally, the reliability of the two variable SFN LSB bits $\bar{a}_{\bar{A}+1}$ and $\bar{a}_{\bar{A}+2}$ is important for understanding which PBCH payloads can be combined by the UE. Indeed, the remaining PBCH bits are expected to stay constant only within the semi-constant PBCH window, and combination of PBCH payloads across different semi-constant PBCH windows may not be possible. An example of this problem is illustrated in FIG. 8.

Figure 8:
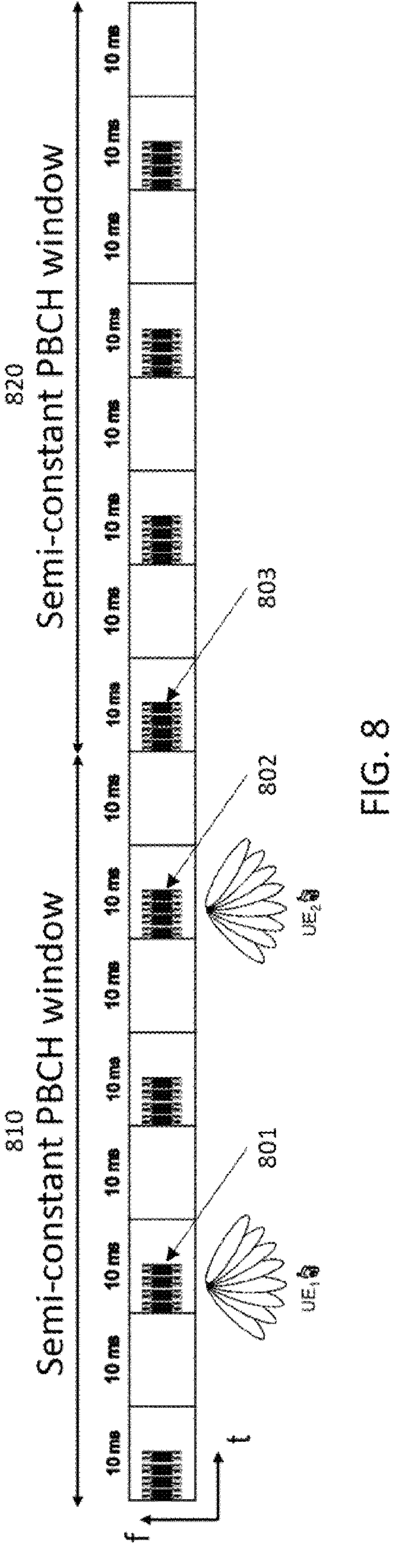
FIG. 8 illustrates detection of synchronization signal blocks at different synchronization signal block bursts.

FIG. 8 illustrates UE detection of SSB at different SSB bursts within the semi-constant PBCH window. In FIG. 8, a first UE ($UE_1$) detects an SSB at the second SSB burst 801 within a first semi-constant PBCH window 810. A second UE ($UE_2$) detects an SSB at the last SSB burst 802 within the first semi-constant PBCH window 810. In case the UEs are not able to correctly decode the PBCH (i.e., CRC does not check out), the UEs will not have information on the current SFN without the partial repetition, and consequently will not be able to know whether they could combine the current PBCH LLRs with the next SSB after 20 ms. In this case, if $UE_2$ blindly decided to combine the information with the next SSB occurrence 803 in the second semi-constant PBCH window 820, it would combine different PBCH information from SSB bursts belonging to different semi-constant PBCH windows, and thus degrade receiver performance.

Thus, it is evident that a correct detection of the two variable SFN LSB bits $\bar{a}_{\bar{A}+}1$ and $\bar{a}_{\bar{A}+2}$ is fundamental for correct combining of the semi-constant PBCH repetitions. For this reason, in some exemplary embodiments, the reliability of the two variable SFN LSB bits ($\bar{a}_{\bar{A}+1}$ and $\bar{a}_{\bar{A}+2}$) may be increased by introducing at least one repetition of these bits as an additional element of an SSB. This addition allows a UE to understand which PBCH payloads to combine and how to coherently combine them, while providing the same benefits as a full PBCH repetition but with reduced signaling overhead.

In the example illustrated in FIG. 8, some exemplary embodiments enable $UE_1$ to know that the detected SSB is the second one within the semi-constant PBCH window, and $UE_1$ is able to combine up to three PBCH repetitions if required. On the other hand, $UE_2$ knows that the detected SSB is the last one within the semi-constant PBCH window, and that combining with the next PBCH repetition is not possible.

FIG. 9 illustrates an exemplary embodiment of an SSB with a partial repetition (SFN REP) 901 of the PBCH payload 903 in the OFDM symbol preceding the OFDM symbol comprising the primary synchronization signal (PSS) 902, wherein the partial repetition comprises at least a subset of the set of least significant bits of the SFN. For example, the at least subset may comprise at least the two variable SFN LSB bits (i.e., the bits $\bar{a}_{\bar{A}+1}$ and $\bar{a}_{\bar{A}+2}$ from FIG. 2). In this example, the PBCH payload 903 may be conveyed by PBCH spread over three OFDM symbols. More specifically, the codeword (payload after CRC attachment and encoding) may be transported over the three OFDM symbols. In this example, it is assumed that the signal carrying the at least one partial repetition 901 spans through all of the 240 subcarriers occupied by a PBCH symbol. The SSB further comprises a secondary synchronization signal (SSS) 904. In FIG. 9, the OFDM symbol number means the order of the OFDM symbols in the SSB. For example, the partial repetition (SFN REP) 901 may be comprised in OFDM symbol 0, and the PSS 902 may be comprised in OFDM symbol 1.

FIG. 10 illustrates an exemplary embodiment of an SSB with a partial repetition (SFN REP) 1001 of the PBCH payload in the same OFDM symbol as the PSS 1002, wherein the partial repetition comprises at least a subset of the set of least significant bits of the SFN. For example, the at least subset may comprise at least the two variable SFN LSB bits $\bar{a}_{\bar{A}+1}$ and $\bar{a}_{\bar{A}+2}$.

FIG. 11 illustrates an exemplary embodiment of an SSB with a partial repetition (SFN REP) 1101 of the PBCH payload in one of the three OFDM symbols comprising the PBCH payload 1102, wherein the partial repetition comprises at least a subset of the set of least significant bits of the SFN. For example, the at least subset may comprise at least the two variable SFN LSB bits $\bar{a}_{\bar{A}+1}$ and $\bar{a}_{\bar{A}+2}$. This exemplary embodiment may be used at least in case additional power is available at the gNB.

Figure 12:
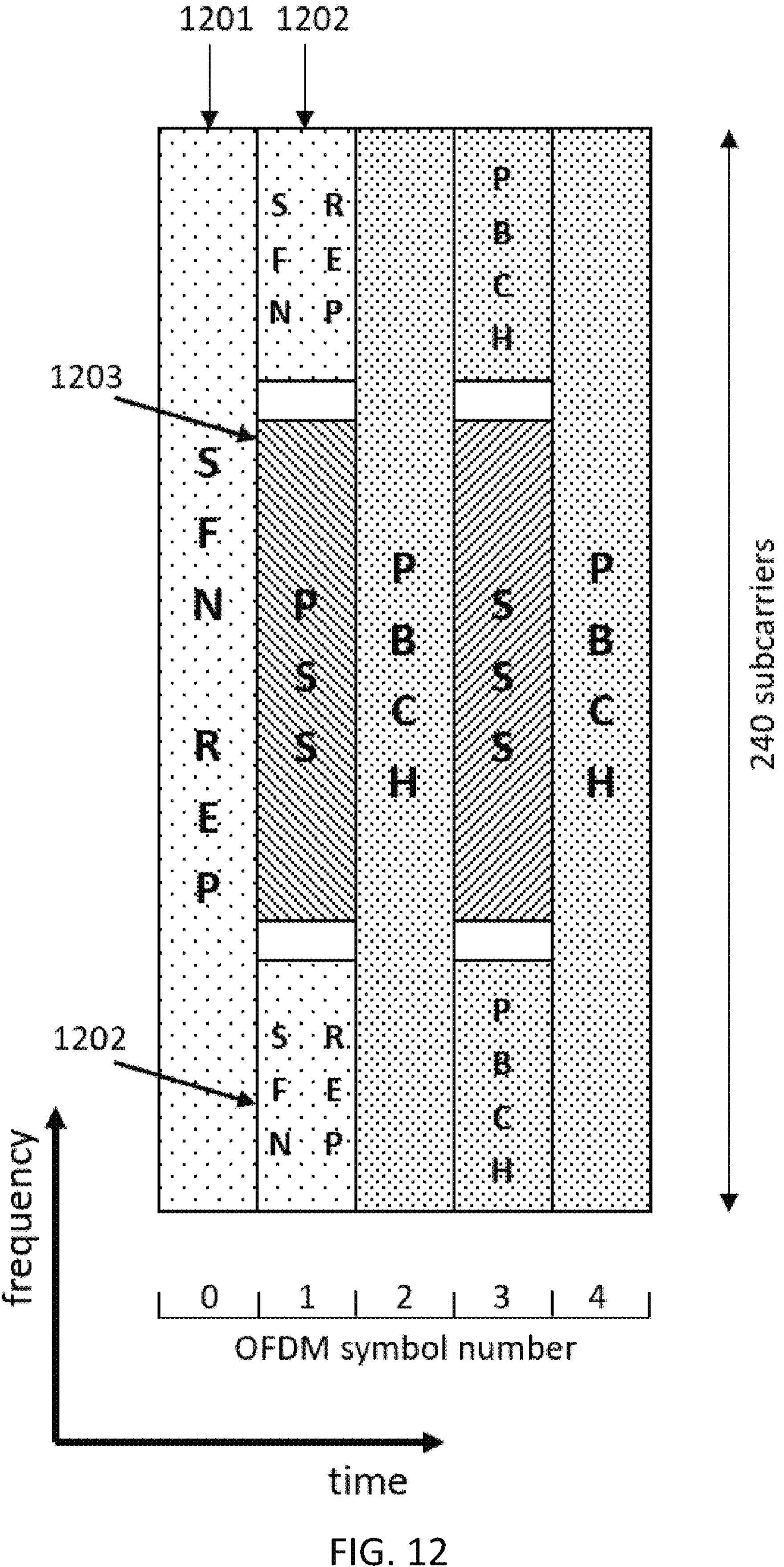

It should be noted that, in some exemplary embodiments, there may also be more than one partial repetition (SFN REP) of the PBCH payload. FIG. 12 illustrates an exemplary embodiment of an SSB with a first partial repetition 1201 of the PBCH payload in the OFDM symbol preceding the OFDM symbol comprising the PSS 1203, and a second partial repetition 1202 of the PBCH payload in the same OFDM symbol as the PSS 1203. The first partial repetition 1201 and the second partial repetition 1202 may comprise at least a subset of the set of least significant bits of the SFN (e.g., at least the two variable SFN LSB bits $\bar{a}_{\bar{A}+1}$ and $\bar{a}_{\bar{A}+2}$).

A technical advantage provided by some exemplary embodiments is that they reduce signaling overhead compared to repeating each PBCH symbol four times, while still providing the same benefits. Four repetitions of each PBCH symbol would occupy 9 additional OFDM symbols per SSB, whereas some exemplary embodiments utilize 0-1 additional OFDM symbols per SSB. Some exemplary embodiments may be beneficial for example for FR2 scenarios with SSB at 120 kHz SCS, where time resources are scarce in the 5 ms SSB burst window.

Figure 13:
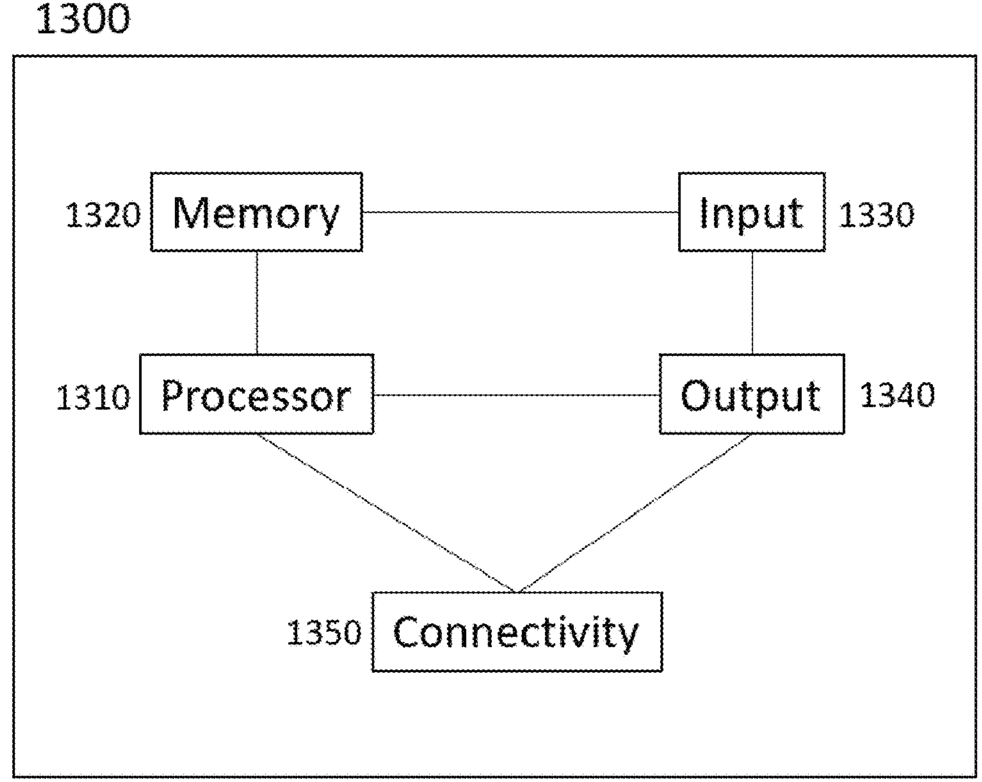
FIGS. 13-14 illustrate apparatuses according to some exemplary embodiments.

FIG. 13 illustrates an apparatus 1300, which may be an apparatus such as, or comprised in, a terminal device, according to an exemplary embodiment. The terminal device may also be referred to as a UE or user equipment herein. For example, the terminal device may be a reduced capability (RedCap) device, or any other UE. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application-specific integrated circuits (ASICs).

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content, such as a light emitting diode (LED) display, a liquid crystal display (LCD) and/or a liquid crystal on silicon (LCoS) display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application-specific integrated circuit (ASIC). The connectivity unit 1350 may comprise one or more components such as a power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
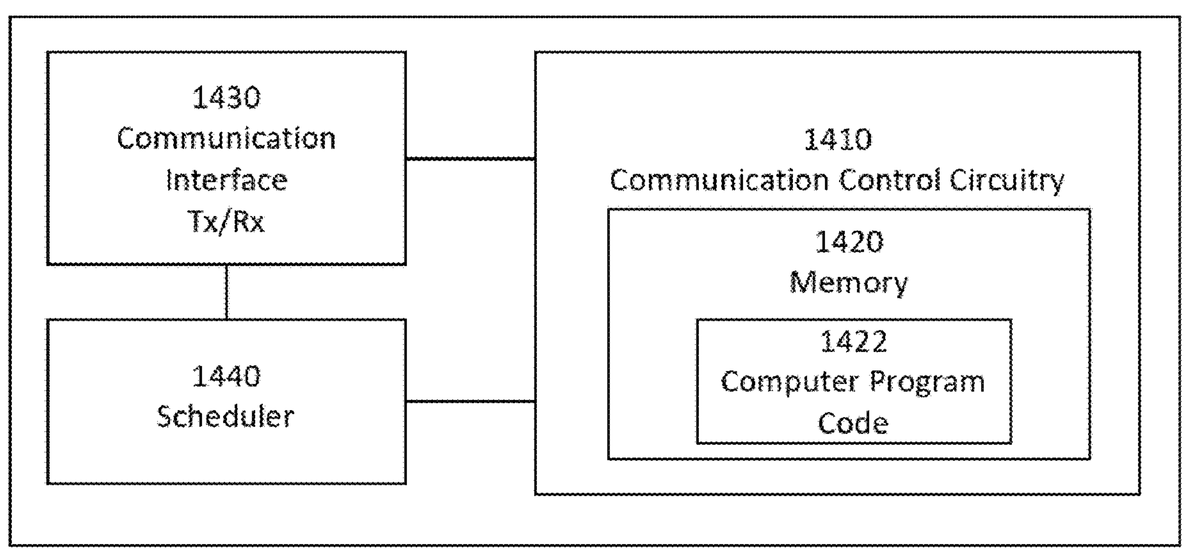

The apparatus 1400 of FIG. 14 illustrates an exemplary embodiment of an apparatus such as, or comprised in, a network element of a wireless communication network. The network element may also be referred to, for example, as a network node, a RAN node, an integrated access and backhaul (IAB) node, an IAB donor node, a NodeB, an LTE evolved NodeB (eNB), a gNB, a base station, an NR base station, a 5G base station, an access node, an access point (AP), a distributed unit (DU), a central unit (CU), a baseband unit (BBU), a radio unit (RU), a radio head, a remote radio head (RRH), or a transmission and reception point (TRP). The apparatus 1400 may comprise, for example, a circuitry or a chipset applicable for realizing some of the described exemplary embodiments. The apparatus 1400 may be an electronic device comprising one or more electronic circuitries. The apparatus 1400 may comprise a communication control circuitry 1410 such as at least one processor, and at least one memory 1420 including a computer program code (software) 1422 wherein the at least one memory and the computer program code (software) 1422 are configured, with the at least one processor, to cause the apparatus 1400 to carry out some of the exemplary embodiments described above.

The processor is coupled to the memory 1420. The processor is configured to read and write data to and from the memory 1420. The memory 1420 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1420 stores computer readable instructions that are executed by the processor. For example, non-volatile memory stores the computer readable instructions and the processor executes the instructions using volatile memory for temporary storage of data and/or instructions.

The computer readable instructions may have been prestored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1400 may further comprise a communication interface 1430 comprising hardware and/or software for realizing communication connectivity according to one or more communication protocols. The communication interface 1430 comprises at least one transmitter (Tx) and at least one receiver (Rx) that may be integrated to the apparatus 1400 or that the apparatus 1400 may be connected to. The communication interface 1430 provides the apparatus with radio communication capabilities to communicate in the cellular communication system. The communication interface may, for example, provide a radio interface to terminal devices. The apparatus 1400 may further comprise another interface towards a core network such as the network coordinator apparatus and/or to the access nodes of the cellular communication system. The apparatus 1400 may further comprise a scheduler 1440 that is configured to allocate resources. The scheduler 1440 may be configured along with the communication control circuitry 1410 or separately configured.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

receive a physical broadcast channel in a synchronization signal block, wherein a payload of the physical broadcast channel comprises at least a set of least significant bits of a system frame number, and the set of least significant bits indicates, at least partly, one or more values of the system frame number, and wherein the set of least significant bits comprises at least four bits;

receive at least one partial repetition of the payload of the physical broadcast channel, wherein the at least one partial repetition is received at least in a symbol preceding or following a symbol comprising a primary synchronization signal comprised in the synchronization signal block, and wherein the at least one partial repetition comprises at least a subset of the set of least significant bits, and the at least the subset of the set of least significant bits comprises at least two bits of the at least four bits;

determine, based at least partly on the at least the subset of the set of least significant bits, whether the synchronization signal block is a first synchronization signal block within a time window;

combine, based on the synchronization signal block not being the first synchronization signal block within the time window based on the determination, one or more log-likelihood ratios of a codeword indicative of the payload with one or more log-likelihood ratios of one or more previously received codewords within the time window, based at least partly on the at least the subset of the set of least significant bits;

decode the codeword indicative of the payload of the physical broadcast channel by decoding the combined one or more log-likelihood ratios; and decode the payload of the physical broadcast channel based on the at least one partial repetition of the payload.

2. The apparatus according to claim 1, wherein the at least one partial repetition comprising the at least the subset of the set of least significant bits is carried by a sequence of a non-orthogonal.

3. The apparatus according to claim 1, wherein the at least one partial repetition comprising the at least the subset of the set of least significant bits is carried by a sequence of an orthogonal sequence set.

4. The apparatus according to claim 3, wherein the codeword indicative of the payload of the physical broadcast channel is received in one or more symbols in the synchronization signal block, and wherein the at least one partial repetition is received in at least one of the one or more symbols comprising the codeword.

5. The apparatus according to claim 3, wherein the codeword indicative of the payload of the physical broadcast channel is received in one or more symbols in the synchronization signal block, and wherein the at least one partial repetition is received at least in a symbol preceding or following the one or more symbols comprising the codeword.

6. The apparatus according to claim 5, wherein the apparatus is a terminal device.

7. A system comprising at least a terminal device and a network element of a wireless communication network;

the network element comprising a first processor and a first memory, wherein the first memory comprises first computer-executable instructions that, when executed by the first processor, causes the network element to perform the following operations:

transmitting a physical broadcast channel in a synchronization signal block, wherein a payload of the physical broadcast channel comprises at least a set of least significant bits of a system frame number, and the set of least significant bits indicates, at least partly, one or more values of the system frame number; and transmitting at least one partial repetition of the payload of the physical broadcast channel, wherein the at least one partial repetition comprises at least a subset of the set of least significant bits;

the terminal device comprising a second processor and a second memory, wherein the second memory comprises second computer-executable instructions that, when executed by the second processor, causes the terminal device to perform the following operations:

receiving a physical broadcast channel in a synchronization signal block, wherein a payload of the physical broadcast channel comprises at least a set of least significant bits of a system frame number, and the set of least significant bits indicates, at least partly, one or more values of the system frame number, and wherein the set of least significant bits comprises at least four bits;

receiving at least one partial repetition of the payload of the physical broadcast channel, wherein the at least one partial repetition is received at least in a symbol preceding or following a symbol comprising a primary synchronization signal comprised in the synchronization signal block, and wherein the at least one partial repetition comprises at least a subset of the set of least significant bits, and the at least the subset of the set of least significant bits comprises at least two bits of the at least four bits;

determining, based at least partly on the at least the subset of the set of least significant bits, whether the synchronization signal block is a first synchronization signal block within a time window;

combining, based on the synchronization signal block not being the first synchronization signal block within the time window based on the determination, one or more log-likelihood ratios of a codeword indicative of the payload with one or more log-likelihood ratios of one or more previously received codewords within the time window, based at least partly on the at least the subset of the set of least significant bits;

decode the codeword indicative of the payload of the physical broadcast channel by decoding the combined one or more log-likelihood ratios; and decode the payload of the physical broadcast channel based on the at least one partial repetition of the payload.

8. The apparatus according to claim 7, wherein the at least one partial repetition comprising the at least the subset of the set of least significant bits is carried by a sequence of a non-orthogonal.

9. The apparatus according to claim 7, wherein the at least one partial repetition comprising the at least the subset of the set of least significant bits is carried by a sequence of an orthogonal sequence set.

10. The apparatus according to claim 9, wherein the codeword indicative of the payload of the physical broadcast channel is received in one or more symbols in the synchronization signal block, and wherein the at least one partial repetition is received in at least one of the one or more symbols comprising the codeword.

11. The apparatus according to claim 9, wherein the codeword indicative of the payload of the physical broadcast channel is received in one or more symbols in the synchronization signal block, and wherein the at least one partial repetition is received at least in a symbol preceding or following the one or more symbols comprising the codeword.

12. A method comprising:

receiving, by an apparatus, a physical broadcast channel in a synchronization signal block, wherein a payload of the physical broadcast channel comprises at least a set of least significant bits of a system frame number, and the set of least significant bits indicates, at least partly, one or more values of the system frame number, and wherein the set of least significant bits comprises at least four bits;

receiving at least one partial repetition of the payload of the physical broadcast channel, wherein the at least one partial repetition is received at least in a symbol preceding or following a symbol comprising a primary synchronization signal comprised in the synchronization signal block, and wherein the at least one partial repetition comprises at least a subset of the set of least significant bits, and the at least the subset of the set of least significant bits comprises at least two bits of the at least four bits;

determining, based at least partly on the at least the subset of the set of least significant bits, whether the synchronization signal block is a first synchronization signal block within a time window;

combining, based on the synchronization signal block not being the first synchronization signal block within the time window based on the determination, one or more log-likelihood ratios of a codeword indicative of the payload with one or more log-likelihood ratios of one or more previously received codewords within the time window, based at least partly on the at least the subset of the set of least significant bits;

decoding the codeword indicative of the payload of the physical broadcast channel by decoding the combined one or more log-likelihood ratios; and decoding the payload of the physical broadcast channel based on the at least one partial repetition of the payload.

13. The method according to claim 12, wherein the at least one partial repetition comprising the at least the subset of the set of least significant bits is carried by a sequence of a non-orthogonal.

14. The method according to claim 12, wherein the at least one partial repetition comprising the at least the subset of the set of least significant bits is carried by a sequence of an orthogonal sequence set.

15. The method according to claim 14, wherein the codeword indicative of the payload of the physical broadcast channel is received in one or more symbols in the synchronization signal block, and wherein the at least one partial repetition is received in at least one of the one or more symbols comprising the codeword.

16. The method according to claim 14, wherein the codeword indicative of the payload of the physical broadcast channel is received in one or more symbols in the synchronization signal block, and wherein the at least one partial repetition is received at least in a symbol preceding or following the one or more symbols comprising the codeword.

17. The method according to claim 16, wherein the apparatus is a terminal device.

* * * * *